Figure 1:
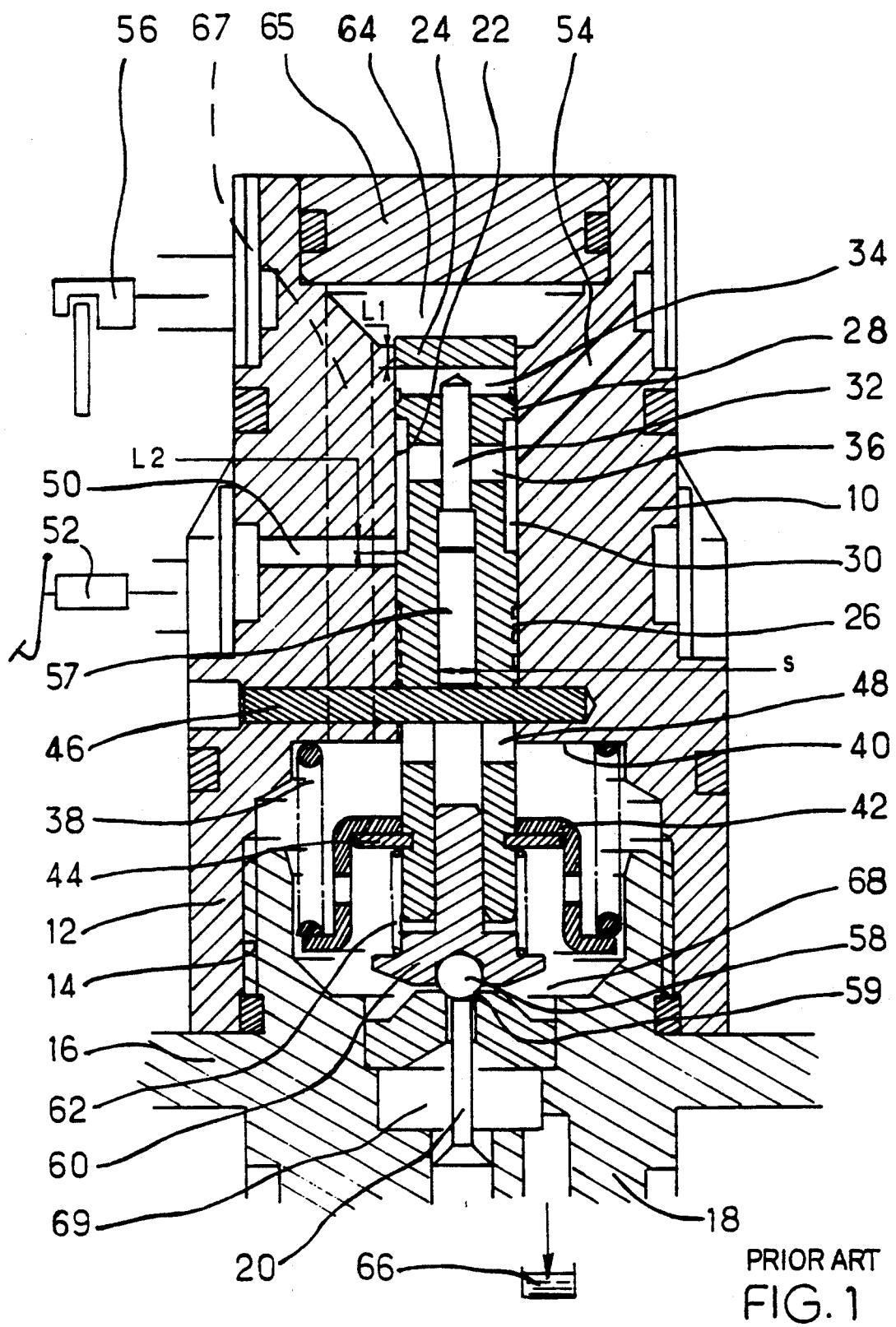

United States Patent [19]

Kervagoret

[11] Patent Number: 5,333,947
[45] Date of Patent: Aug. 2, 1994

[54] SOLENOID VALVE FOR A WHEEL ANTILOCKUP SYSTEM

[75] Inventor: Gilbert Kervagoret, Argenteuil, France

[73] Assignee: Bendix Europe Services Techniques, Drancy, France

[21] Appl. No.: 898,364

[22] Filed: Jun. 15, 1992

[30] Foreign Application Priority Data

Jun. 27, 1991 [FR] France .................... 9107940

[51] Int. Cl.$^5$ ........................................... F15B 13/044
[52] U.S. Cl. ............................ 303/119.2; 91/433; 137/596.17
[58] Field of Search ............ 91/433; 137/596.17; 303/119 SV, 119.2

[56] References Cited

U.S. PATENT DOCUMENTS

| | | | |
|---|---|---|---|
| 2,617,444 | 11/1952 | Gardner | 137/625.64 |
| 3,537,467 | 11/1970 | Marshall | 137/596.64 X |
| 3,880,476 | 4/1975 | Belart et al. | 137/625.65 |
| 3,995,652 | 12/1976 | Belart et al. | 137/102 |
| 4,014,509 | 3/1977 | Yoshino et al. | 137/625.64 X |
| 4,453,565 | 6/1984 | Neff | 137/884 X |
| 4,643,225 | 2/1987 | Imhof | 137/625.65 X |
| 4,936,344 | 6/1990 | Kervagoret et al. | 137/596.17 |
| 5,186,093 | 2/1993 | Kervagoret | 137/596.17 X |
| 5,186,210 | 2/1993 | Guasch | 137/596.17 |

FOREIGN PATENT DOCUMENTS

| | | |
|---|---|---|
| 0215272 | 3/1987 | European Pat. Off. . |
| 0218823 | 4/1987 | European Pat. Off. . |
| 0342091 | 11/1989 | European Pat. Off. . |
| 3-276853 | 12/1991 | Japan . |

*Primary Examiner*—Gerald A. Michalsky
*Attorney, Agent, or Firm*—Larry J. Palguta; Ken C. Decker

[57] ABSTRACT

The invention relates to a solenoid valve, in particular for a hydraulic braking circuit of a motor vehicle with a wheel antilockup device, the solenoid valve being disposed between at least a pressurized fluid source (52) and at least a pressure receiver (56) and comprising, in a body (10), a piston mechanism (24) which can be displaced between a rest position, in which it permits communication between the pressurized fluid source (52) and the pressure receiver (56), and a work position, in which it permits communication between the pressure receiver (56) and a low-pressure fluid reservoir (66). According to the invention, the piston mechanism (24) is permanently stressed toward the rest position by a constant force.

4 Claims, 2 Drawing Sheets

SOLENOID VALVE FOR A WHEEL ANTILOCKUP SYSTEM

The subject of the present invention is a solenoid valve, more particularly intended to be inserted in a hydraulic braking circuit for a motor vehicle, between a master cylinder and the brake motors in a wheel antilockup system.

Hydraulic braking circuits with a wheel antilockup device are known and typically comprise, between the pressurized braking fluid source, such as an electropump or a so-called "full power" master cylinder, and the brake motors, computer-controlled solenoid valves permitting a reduction in the pressure of the brake motors when the computer detects wheel lockup and a moderated rise in pressure in the brake motors when the computer detects too great a speed of rotation of the wheels.

The solenoid valves used in these wheel antilockup devices are generally two-position solenoid valves operating in an "all or nothing" manner which give rise to considerable energy consumption on the part of the electropump due to the succession of intake/release phases during operation of the antilockup device. It has also been proposed to use proportional solenoid valves but, when it is desired to minimize hydraulic leakages in order to reduce the energy consumption of the electropump, a hysteresis phenomenon appears in the curve representing the hydraulic pressure in the brake motors as a function of the force for actuating the solenoid valve and thus the electric current circulating therein, this hysteresis interfering with control of the pressure in the brake motor by the computer associated with the antilockup device.

The object of the present invention is thus to produce a solenoid valve, for a wheel antilockup device, whose energy consumption is as low as possible and which is simple and is reliable in operation, permitting accurate monitoring of the pressure in the brake motors.

This object of the invention is achieved by providing a solenoid valve, particularly intended to be inserted in a hydraulic braking circuit between at least a pressurized braking fluid source and at least a pressure receiver in a wheel antilockup system, comprising, in a body, a piston means which can be displaced between a rest position, in which it permits communication between the pressurized fluid source and the pressure receiver, and a work position, in which it permits communication between the pressure receiver and a low-pressure fluid reservoir, characterized in that the piston means is permanently stressed towards its rest position by a constant force.

This constant force is advantageously obtained by applying a constant pressure on a constant surface, in particular of the piston means.

According to a feature of the invention, the constant surface is formed on a slide valve forming the piston means, over a cross-section of a bearing surface of this slide valve or over the difference of the cross-sections of two bearing surfaces of the slide valve.

For example, the solenoid valve of the invention may comprise a pressure limiter capable of providing the constant pressure from the source pressure, this limiter itself comprising a second slide valve which is movable through the effect of the source pressure against a force exerted by a return spring, this spring being calibrated to a value such that this second slide valve, by virture of its displacement, is released from the effect of the source pressure when the latter exceeds said constant pressure.

It is, then, desirable for the constant pressure to be fixed at a relatively low value and, for example, between 5 and 10 bars.

Figure 2:
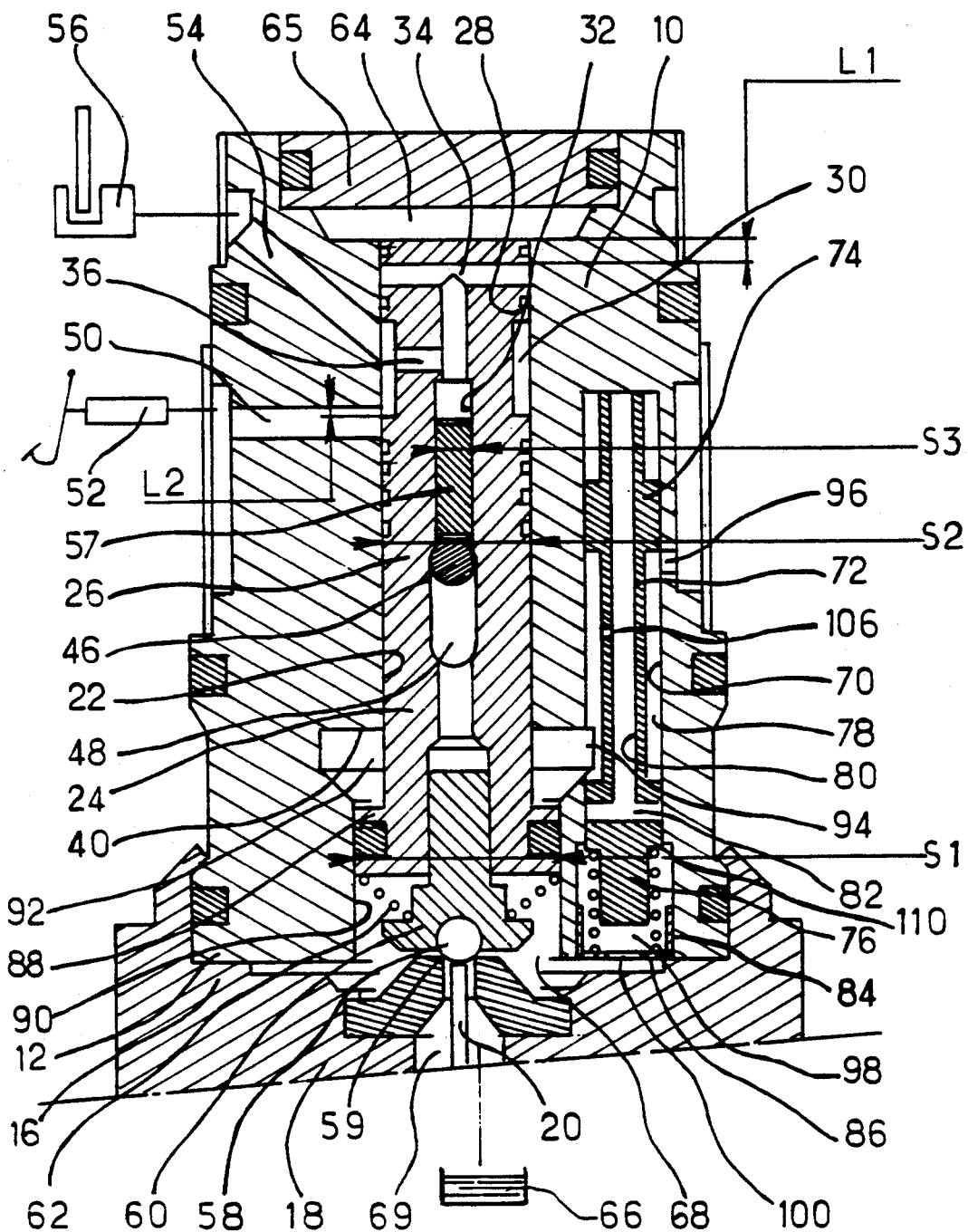

Other features and advantages of the present invention will emerge from the following description of an embodiment given by way of illustration but which is in no way limiting, with reference to the appended drawings, in which:

FIG. 1 is a longitudinal sectional view of a solenoid valve of the prior art, and FIG. 2 is a longitudinal sectional view of a solenoid valve produced in accordance with the invention.

The solenoid valve shown in FIG. 1 consists of a body 10 of generally cylindrical shape, one of the ends 12 of which is equipped with a bore 14 for fastening, for example by screwing, the base 16 of an electromagnet 18 (not shown) actuating, under computer control (not shown), a plunger 20.

A bore 22 is also formed in the body 10, a slide valve 24 sliding in said bore in a virtually leaktight manner. The slide valve 24 principally comprises two bearing surfaces 26 and 28 on either side of a groove defining an annular volume 30. A blind bore 32 is formed axially in the slide valve 24 and emerges in a radial bore 34 formed in the slide valve 24 at the level of the bearing surface 28. Another radial bore 36 is formed in the slide valve 24 at the level of the annular groove 30.

The slide valve 24 is returned to its rest position by a return spring 38 bearing, on the one hand, on a shoulder 40 formed in the body 10 between the bores 22 and 14, and, on the other hand, on a collar 42 which itself bears on a lockwasher 44 integral with the slide valve 24. The rest position of the slide valve 24 is defined by a pin 46 inserted in the body 10 and interacting with an oblong aperture 48 made radially in the slide valve 24.

In the rest position shown in FIG. 1, the annular groove 30 of the slide valve 24 permits communication between a passage 50 formed in the body 10 and connected to a pressurized fluid source 52, such as a master cylinder, and a passage 54 also formed in the body 10 and connected to a pressure receiver 56, such as a brake motor. A closure element 57 in the blind bore 32 confines the pressurized fluid in this bore, the bore 34 being closed by the leaktight interaction of the bearing surface 28 with the wall of the bore 22 of the body 10. The solenoid valve thus permits conventional operation of the braking circuit of the vehicle thus equipped, in the case of braking operations which do not require the intervention of the wheel antilockup device.

When the computer detects the imminent locking-up of a wheel, it commands the excitation of the electromagnet 18. The plunger 20 then comes up against a ball 58 integral with a guide 60 sliding in the bore 32 of the slide valve 24 and stressed towards the plunger 20 by a return spring 62 disposed between a shoulder of the guide 60 and the lockwasher 44. The ball 58 forms the movable element of a ball valve which interacts with a valve seat 59 formed on the base 16 of the electromagnet 18 coaxially with the plunger 20. The valve 58–59 is thus closed at rest, that is to say outside antilockup phases, in order to isolate the electromagnet in a leaktight manner from the internal circuits of the solenoid valve which communicate with the braking circuit.

When the electromagnet 18 is excited, the plunger 20 firstly stresses the ball 58 and the guide 60 against the spring 62 until the guide 60 comes up against the slide valve 24, then the latter is also stressed (upwards in FIG. 1) against the spring 38. In this movement, the bearing surface 26 of the slide valve 24 firstly closes the passage 50, thus preventing the supply of pressurized fluid to the receiver 56, then the bearing surface 28 of the slide valve 24 is displaced sufficiently for the bore 34 to be opened and to emerge in a chamber 64 formed at the end of the body 10 opposite that which receives the electromagnet 18 and which is closed by a plug 65. The chamber 64 is connected via a hole 67 made in the body 10 with the annular space 68 around the ball 58 and the guide 60 and with the annular space 69 around the plunger 20 when it raises the ball 58 from its seat 59 upon excitation of the electromagnet. The annular space 69 is itself in communication with a low-pressure fluid reservoir 66.

The pressure receiver 56 thus communicates, when the electromagnet 18 is excited, with the low-pressure reservoir 66, via the passage 54, the annular groove 30, the radial bore 36, the axial bore 32, the radial bore 34, the chamber 64, the hole 67 and the annular spaces 68 and 69, the axial bore 32 further being closed by the element 57 as seen above. The pressure in the pressure receiver 56 can then drop until the computer detects too great a speed of rotation in the wheel associated with the receiver 56. The computer then commands the deexcitation of the electromagnet 18, which enables the slide valve 24 to return to its rest position under the action of the return spring 38. The pressure receiver 56 is then isolated from the low-pressure reservoir 66 and connected to the low-pressure fluid source 52. Such pressure fall and rise cycles are thus repeated until the vehicle stops or until the pressure supplied by the pressure source 52 drops, thus eliminating the risk of wheel lockup.

In a solenoid valve as just described and in its operation, it is obviously important to minimize leakages of braking fluid. It is thus necessary for the slide valve 24 to close the passage 50 before opening the passage 34 in order to prevent the pressure source 52 flowing directly into the low-pressure reservoir 66. That is to say it is necessary to provide a slide valve with positive overlap, the length of overlap being defined by the path L of the slide valve, with $L=L1-L2$, L1 being the opening path of the bore 34 in the chamber 64 and L2 being the closure path of the passage 50 in the annular volume 30.

It has been seen above that the movements of the slide valve 24 are commanded in one direction by the plunger 20 of the electromagnet 18 and in the other direction by the return spring 38. It follows that, when it is excited, the electromagnet expends a certain amount of energy to overcome the force of the spring 38, increasing as a function of the stiffness of the latter as the slide valve covers the distance L. This thus results in a hysteresis of the curve giving the pressure of the braking fluid in the receiver 56 and in the passage 54 as a function of the force exerted by the plunger 20 of the electromagnet on the slide valve 24 against the spring 38.

It has been observed that this pressure hysteresis due to the combined effects of the positive overlap over the length L and of the stiffness of the spring 38 makes monitoring the pressure in the brake motors, by means of commanding the successive excitations and de-excitations of the electromagnet 18, extremely inaccurate. In fact, the pressure hysteresis is represented by the term $RL/s$, where R is the stiffness of the spring 38 and s is the cross-section of the element 57.

Although R and s are known with accuracy, this is not the case with the overlap length L, only its limits being provided by the series of dimensions and tolerances.

These problems are solved by virtue of the solenoid valve produced in accordance with the invention and an embodiment of which has been shown in FIG. 2. In this figure, elements which are identical to those in FIG. 1 bear the same reference numerals.

In its rest position shown in FIG. 2, the solenoid valve operates like that in FIG. 1 in the case of braking operations which do not require the intervention of the wheel antilockup device: the pressure emitter 52 is connected to the pressure receiver 56 by the passage 50, the annular groove 30 and the passage 54.

Operation of the solenoid valve of the invention in the antilockup phase will now be explained. It can be seen in FIG. 2 that a blind bore 70 has been made in the body 10, for example parallel to the bore 22.

The bore 70 receives a slide valve 72 comprising two bearing surfaces 74 and 76 on either side of a groove defining an annular volume 78. The slide valve 72 is itself formed with an axial blind bore 80 emerging in a radial bore 82 formed at the level of the bearing surface 76. The slide valve 72 is returned to its rest position by a return spring 84 bearing, on the one hand, on a shoulder 110 of the slide valve 72 and, on the other hand, on the body 10 or on a collar 86 integral with the body 10, or, for example, inserted between the latter and the base 16 of the electromagnet 18.

Moreover, the slide valve 24 comprises a third bearing surface 88 interacting in a leaktight manner with a bore 90 of the body 10, coaxial with the bore 22. The bearing surfaces 26 and 88 together and with the bores 22 and 90 define an annular volume 92. This annular volume 92 is in constant communication, regardless of the positions of the slide valves 24 and 72, via a passage 94 in the body 10, with the annular volume 78 defined around the slide valve 72 which is itself in communication, via a passage 96, with the passage 50 connecting with the pressurized fluid source 52.

Finally, the bearing surface 76 of the slide valve 72 is capable of interacting with the bore 70 in order to close the bore 82 in the rest position of the slide valve 72 or, alternatively, to cause this bore to emerge into a chamber 98 where it is possible to locate, for example, the return spring 84, when the slide valve 72 is in its work position. This chamber 98 is in communication via a passage 100 with the annular space 68 around the ball 58 and the annular space 69 around the plunger 20 of the electromagnet 18 if the latter is excited, itself in communication with the low-pressure reservoir 66.

The operation of the solenoid valve outside antilockup phases is as described above. The addition of the slide valve 74 does not modify this phase of operation since the pressure created by the pressure source 52, if it is properly transmitted to the pressure receiver 56, is also transmitted, via the passage 96, the annular volume 78 and the passage 94 to the annular volume 92. This pressure is then exerted on the cross-section S1 of the bearing surface 88 of the slide valve 24 reduced by the cross-section S2 of the bearing surface 26 of the slide valve 24, and thus stresses the slide valve 24 in its rest position shown in FIG. 2.

On the other hand, during the antilockup phases, when the computer detects a tendency of one or more wheels to lock up, it has been seen that said computer excites the electromagnet 18 in order to place the brake motor 56 alternately in connection with the pressure source 52 or with the low-pressure reservoir 66.

When the electromagnet 18 is excited, the plunger 20 displaces the slide valve 24 (via the ball 58 and the guide 60) into its active position. During this phase of excitation of the electromagnet, the annular space 68 communicates with the annular space 69 and thus with the low-pressure reservoir 66. The pressure emitted by the pressure source 52 is no longer transmitted to the receiver 56 when the slide valve 24 is in its active position, but is transmitted, by the passage 96, to the annular volume 78 and, by the passage 94, to the annular volume 92.

In the annular volume 78, the pressure of the source 52 is exerted on the cross-section of the bearing surface 76, a passage 106 having been made in the slide valve 74 in order to cause this volume 78 to communicate with the inside of the bore 80. As the cross-section of the bearing surface 76 is subject on the other side to the pressure of the low-pressure reservoir which prevails in the annular space 68, the slide valve 74 will be displaced when the pressure P of the source 52 has reached a value equal to that necessary for overcoming the force of the return spring 84. In this displacement, the bearing surface 74 of the slide valve 72 will close the passage 96, thus preventing any subsequent increase in pressure in the annular space 78. It can thus be seen that this annular space 78, as well as the annular volume 92 with which it communicates, is at this pressure P. If the pressure in the annular volume 92 drops, the return spring displaces the slide valve 72 in order to open the passage 96, thus causing the pressure in the annular space 78 to rise to the value P. If the pressure in the annular volume 92 increases, it acts on the cross-section of the bearing surface 76 in order to open the passage 82 towards the reservoir, thus causing the pressure in the annular space 78 to decrease to the value P.

It can thus be seen that, during operation, the pressure of the fluid contained in the annular volume 92 remains constant, at a value P, or undergoes only very slight variations about this value. These negligible variations can advantageously be damped by choosing, for the passage 106 in the slide valve 72, a fairly small cross-section in order to slow the movement of fluid across it, in the manner of a flow limiter.

It can thus be seen that the annular volume 92 is subject to a constant pressure P, determined solely by the calibration of the spring 84. This spring 84 may thus be chosen freely so that this pressure P can have any predetermined value. Advantageously, it will be possible to choose a low value of P, for example between 5 and 10 bar, whereas the pressure emitted by the pressure source 52 may reach and even exceed 100 bar.

The slide valve 24 is thus subject to a force $F_1$ produced by the constant pressure P being exerted on the surface $S_1$ of the bearing surface 88, reduced by the surface $S_2$ of the bearing surface 26. As these surfaces are obviously constant, it follows that the slide valve 24 is subject to a constant return force $F_1 = P \times (S_1-S_2)$, which may also be freely chosen at any predetermined value. This results in several major advantages afforded by the invention.

The slide valve 24 is, moreover, subject to a force $F_2$ exerted by the plunger 20 of the electromagnet 18 and to a force $F_3$ exerted by the pressure Q prevailing in the pressure receiver 56 and being exerted on the cross-section S3 of the bore 32, such that $$Q = \frac{F1 - F2}{S3} = \frac{P(S1 - S2) - F2}{S3}$$

the action exerted by the spring 62 being regarded as negligible.

It can thus be seen clearly that, with the solenoid valve of the invention, the pressure Q in the pressure receiver 56 is controlled by the computer by controlling the force $F_2$ exerted by the plunger 20 of the electromagnet 18, the pressure Q being a function of the force $F_2$, no term introducing any hysteresis into this function.

In fact, the action of a spring on the slide valve has been replaced by that of a constant pressure which can be assimilated with that of a spring of zero stiffness. The hysteresis term RL/S3 is thus zero regardless of the value of L. The limits of L can thus be freely fixed in order to minimize or even eliminate fluid leakages, with the ensuing results. As the return force of the slide valve is constant and low, the electromagnet 18 may be of small size and have a low electrical consumption requirement.

As fluid leakages are minimal, the pressure emitter 52, for example an electropump, may also be of small size and have a low electrical consumption requirement. The electrical and electronic stages for control of the electromagnet and the electropump may thus be greatly simplified and dissipate less energy. This thus results in a considerable reduction in the cost of the complete wheel antilockup device, combined with greater reliability and simplicity in manufacture and operation.

Although described in connection with a preferred embodiment, the solenoid valve of the invention is capable of undergoing numerous variations which will be apparent to a person skilled in the art. Thus, for example, the constant return force of the main slide valve may be created in a chamber outside the body of the solenoid valve and be transmitted to the slide valve by a needle or a plunger passing through this body in a leaktight manner. The leaktightness of such a passage is not critical if it takes place in the plug closing the chamber in communication with the low-pressure reservoir.

Provision may also be made for the slide valve itself to pass through the plug closing the chamber connected to the low-pressure reservoir, the constant pressure being applied on the end face of the slide valve. These two variations permit use of solenoid valves of the prior art by dispensing with the return spring of the slide valve and by modifying only the end plug, and make it possible to dispose the slide valve, delivering the constant pressure, independently of the solenoid valve.

I claim:

1. A solenoid valve in combination with a hydraulic brake circuit of a motor vehicle with a wheel antilock device, the solenoid valve disposed between at least a pressurized fluid source and a pressure receiver and comprising, in a body, piston means displaceable between a rest position, in which the pressurized fluid source communicates with the pressure receiver, and a work position, in which the pressure receiver communicates with a low-pressure fluid reservoir, characterized in that the piston means is stressed permanently toward the rest position by a constant force resulting from an operable mechanism effecting a single constant fluid pressure acting on a constant surface of the piston means in each position of the piston means, the piston means comprising a first slide valve, the constant surface of the piston means comprising the difference between the cross-sections of two bearing surfaces of the slide valve, and the operable mechanism comprising a pressure limiter providing said constant fluid pressure from the pressurized fluid source.

2. The solenoid valve, brake circuit, vehicle, and anti-lock device according to claim 1, characterized in that the pressure limiter comprises a second slide valve which is movable through the effect of the pressurized fluid source against a force exerted by a return spring, the spring being calibrated to a value such that the second slide valve, by virtue of its displacement, is released from an increased effect of the pressurized fluid source when pressure from the pressurized fluid source exceeds said constant fluid pressure.

3. The solenoid valve, brake circuit, vehicle, and anti-lock device according to claim 2, characterized in that said constant fluid pressure is between 5 and 10 bars.

4. The solenoid valve, brake circuit, vehicle, and anti-lock device according to claim 2, wherein the second slide valve is displaced by increasing fluid pressure from the pressurized fluid source so that communication of increasing fluid pressure from the pressurized fluid source to the constant surface on the piston means ceases and the constant fluid pressure maintained, and when the constant fluid pressure decreases, so that the constant force decreases, the return spring displaces the second slide valve to recommence the communication of fluid pressure from the pressurized fluid source to the second slide valve to effect attainment of the constant fluid pressure.

* * * * *